United States Patent [19]
O'Connor et al.

[11] Patent Number: 5,848,469
[45] Date of Patent: Dec. 15, 1998

[54] VEHICLE FRAME WITH SIDE/CROSS MEMBER JOINT

[75] Inventors: James P. O'Connor, Sylvan Lake; Richard Marlin, Troy; Bruce D. Kocer, Oxford, all of Mich.

[73] Assignee: The Budd Company, Troy, Mich.

[21] Appl. No.: 721,216

[22] Filed: Sep. 26, 1996

[51] Int. Cl.[6] .................................................. B23P 15/00
[52] U.S. Cl. ........................ 29/897.2; 29/523; 403/277; 296/29
[58] Field of Search ............................ 29/897.2, 897.312, 29/523; 403/248, 277, 280, 279, 282; 296/29

[56] References Cited

U.S. PATENT DOCUMENTS

| | | | |
|---|---|---|---|
| 1,840,928 | 1/1932 | Anthony | 296/96 |
| 1,990,757 | 2/1935 | Stiles | 296/29 |
| 2,115,931 | 5/1938 | Matthaei . | |
| 2,194,349 | 3/1940 | Almdale | 280/106 |
| 2,746,763 | 5/1956 | Nallinger . | |
| 2,958,127 | 11/1960 | Johnson . | |
| 3,119,435 | 1/1964 | Greenman . | |
| 3,140,540 | 7/1964 | Greenman . | |
| 3,300,231 | 1/1967 | Luli et al. . | |
| 3,327,385 | 6/1967 | Shaver . | |
| 3,349,870 | 10/1967 | Lieblein . | |
| 3,670,405 | 6/1972 | Dochterman . | |
| 3,761,116 | 9/1973 | Scheitlin et al. . | |
| 3,851,378 | 12/1974 | Dessert . | |
| 4,093,253 | 6/1978 | Lehr . | |
| 4,698,896 | 10/1987 | Osterwald et al. . | |
| 4,934,038 | 6/1990 | Coludill | 29/523 |
| 4,951,391 | 8/1990 | Seabra | 29/890.14 |
| 4,972,571 | 11/1990 | Cole et al. | 29/523 |
| 5,158,389 | 10/1992 | Osterwald et al. . | |
| 5,170,552 | 12/1992 | Swiderski et al. . | |
| 5,177,927 | 1/1993 | Goya et al. | 403/277 |
| 5,259,689 | 11/1993 | Arand et al. | 403/248 |
| 5,322,208 | 6/1994 | Hinrichs et al. | 29/897.2 |
| 5,458,393 | 10/1995 | Benedyk . | |
| 5,561,902 | 10/1996 | Jacobs et al. | 29/897.2 |
| 5,704,752 | 1/1998 | Logerot | 403/248 |
| 5,718,048 | 2/1998 | Morton et al. | 296/29 |

OTHER PUBLICATIONS

GWS Tool & Die Inc., "Tube Forming Solutions", Canada.

*Primary Examiner*—Larry I. Schwartz
*Assistant Examiner*—Marc W. Butler
*Attorney, Agent, or Firm*—Harness, Dickey & Pierce, P.L.C.

[57] ABSTRACT

A vehicle frame having a side/cross member joint, including a pair of side members each having at least one opening therethrough, the openings having a plurality of generally straight edge portions. A cross member is connected to the side members, wherein the one cross member is disposed in the openings in the side members. The cross member is deformed radially outwardly such that an outer surface of the cross member is formed with a pair of grooves having radially extending walls on opposite sides of each of the openings in the side member. A plurality of flat and semi-circular portions are formed in the cross member corresponding with the straight edge portions and the semi-circular edge portions of the openings.

8 Claims, 4 Drawing Sheets

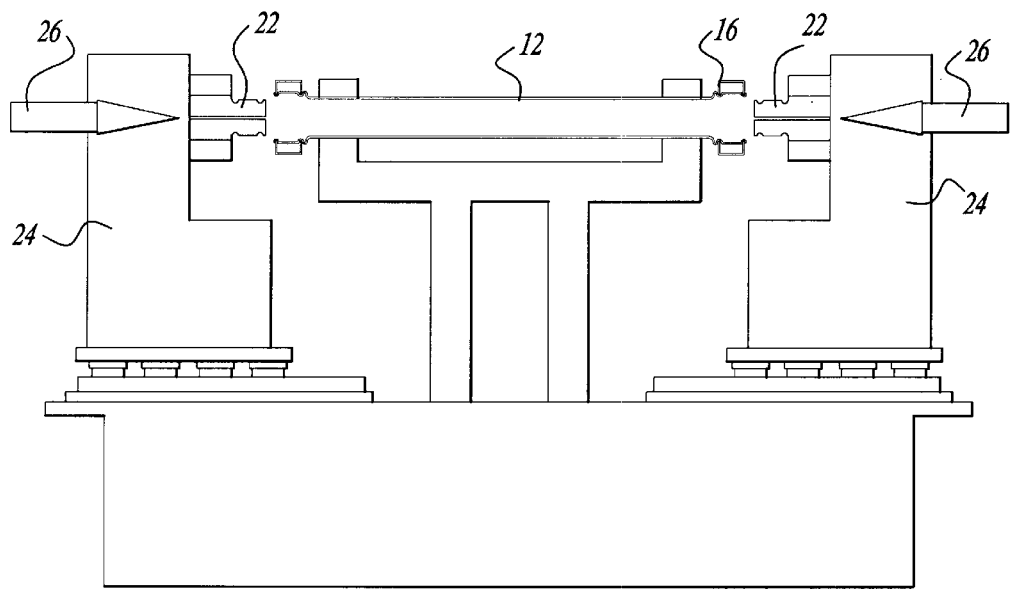
_Fig-5_
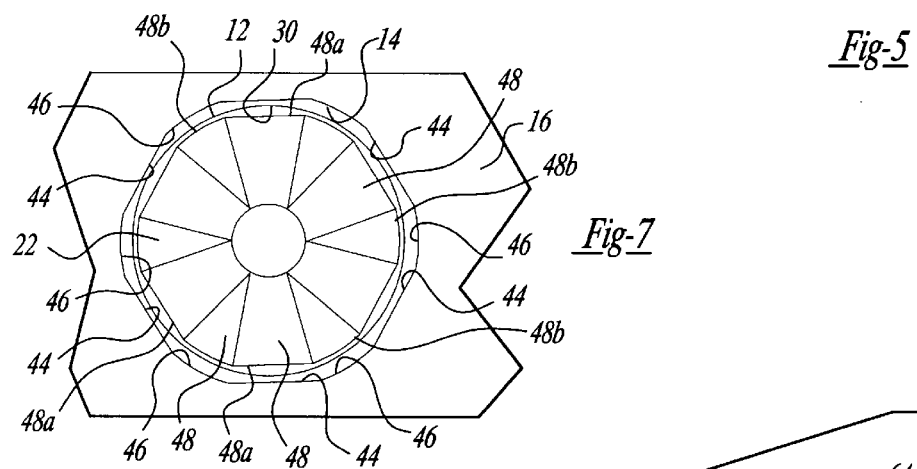
_Fig-7_
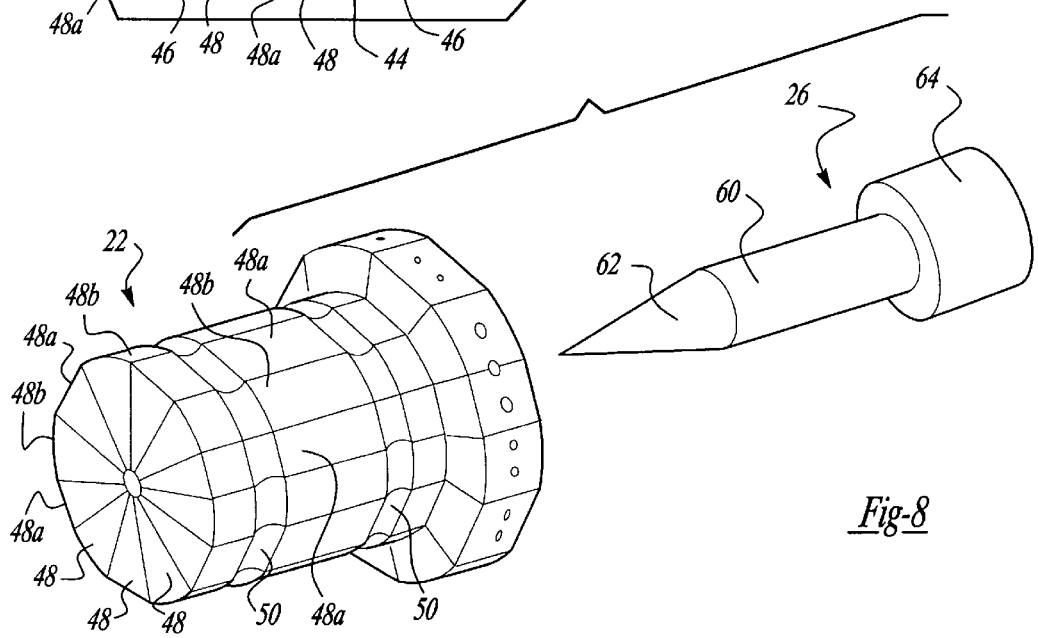
_Fig-8_

VEHICLE FRAME WITH SIDE/CROSS MEMBER JOINT

BACKGROUND OF THE INVENTION

FIELD OF THE INVENTION

The present invention relates to frame structures and, more particularly, to a vehicle frame with side/cross member joints.

BACKGROUND AND SUMMARY OF THE INVENTION

In the manufacture of frames for motor vehicles, it is desirable to provide a frame structure which is rigid. It is generally known in the prior art to form a frame structure having a pair of longitudinally extending main beams which are interconnected by cross members. Attaching cross members to side rails of a vehicle chassis has previously been achieved by providing a C-shaped bracket adjacent to an opening in the side rail which receives the cross member and which is welded to the side rail and cross member in order to secure the cross member to the side rail. The problem with this conventional method of attaching the cross members to the side rails is that a lot of welding must be performed in order to properly secure the C-shaped brackets to the cross members and to the side rails. The addition of the brackets for supporting the cross members also increases the weight of the vehicle chassis. Thus, it is desirable to provide a side/cross member joint which requires less welding and does not require the additional brackets used with conventional side/cross member joints.

Accordingly, the preferred embodiment of the present invention provides a vehicle frame having a side/cross member joint, comprising: a pair of side members each having at least one opening therethrough, said openings having a plurality of generally straight edge portions and a plurality of generally semi-circular edge portions interconnecting said generally straight edge portions; at least one cross member connected to said side members, wherein said at least one cross member is disposed in said openings in said side members and said cross member is deformed radially outwardly such that an outer surface of said cross member is formed with a pair of grooves having radially extending walls on opposite sides of each of said openings in said side member and a plurality of flat and semi-circular portions corresponding with said straight edge portions and said semi-circular edge portions of said openings.

A method of making a side/cross member joint for a vehicle frame is also provided, in accordance with the teachings of the preferred embodiment comprising the steps of: providing at least one side member having two opposed side walls each having at least one opening therethrough, a periphery of said opening including a plurality of semi-circular segments connected to a plurality of generally straight segments; inserting a generally cylindrical cross member in said opening in said at least one side member; inserting an expanding mechanism in an end of said cross member, said expanding mechanism including a plurality of radially movable fingers each having a pair of recessed groove portions corresponding with said openings in said opposed side walls of said side member, wherein a plurality of said radially movable fingers have a generally flat radially outermost surface, corresponding with said generally straight segments of said openings, and a plurality of said radially movable fingers have a generally cylindrical radially outermost surface corresponding with said semicircular segments of said openings; and activating said expanding mechanism while said expanding mechanism is inserted in said end of said cross member, wherein said cross member is deformed radially outwardly such that an outer surface of said cross member is formed with grooves having radially extending walls on opposite sides of said openings in said side member.

Further scope of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings wherein:

FIG. 5 is an end view of the apparatus shown in FIG. 1 with the expanding mechanism removed from the end of the cross members after the side/cross member joint has been formed;

FIG. 7 is an end view of the cross member as received in the opening in the side rail and showing the expanding mechanism received therein for forming the side/cross member joint;

FIG. 8 is an exploded perspective view of the expanding mechanism and mandril which is used for activating the expanding mechanism according to the principles of the present invention;

DETAILED DESCRIPTION OF THE PREFERRED EMBODIMENTS

Figure 9:
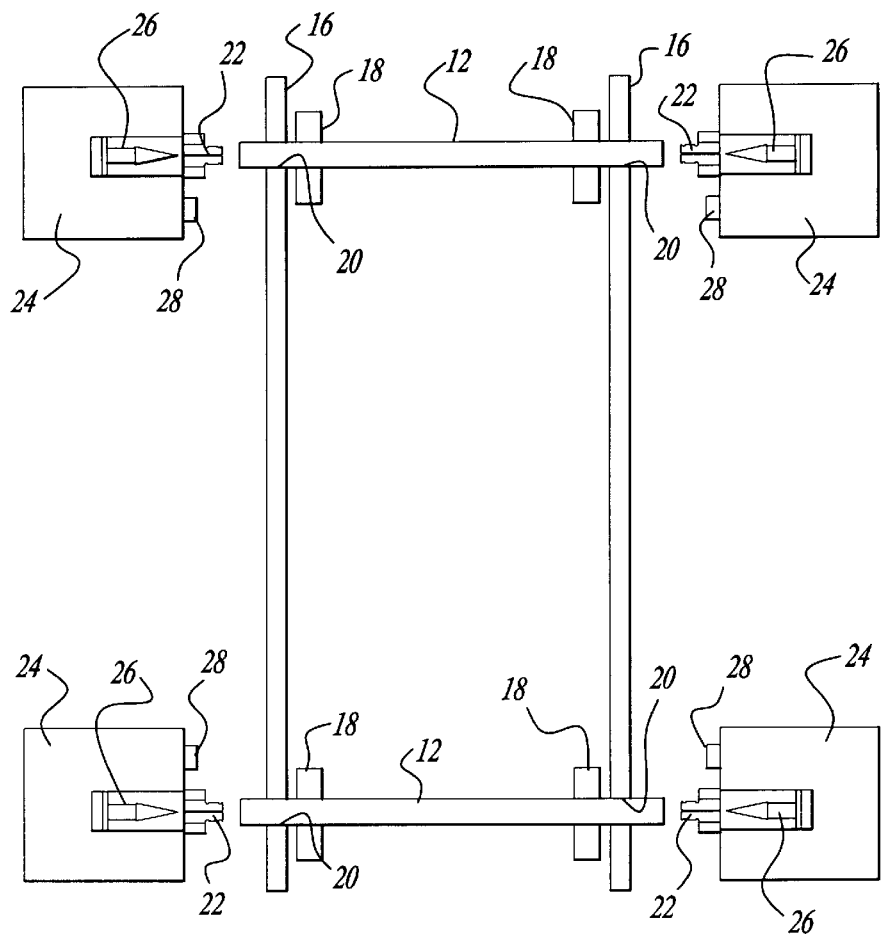
FIG. 9 is a plan view of the apparatus for forming the side/cross member joint in a vehicle frame having four joint forming stations.

With reference to the attached Figures, the present invention will be described. In FIG. 9, and with additional reference to FIG. 10 a vehicle frame 10 is shown in an unassembled condition having a pair of cross members 12 inserted through openings 14 in side rails 16. Cross members 12 are supported by spacer arms 18 which are provided with a U-shaped slot 20.

An expanding mechanism 22 is supported on a base member 24 at each corner of the work station. Base 24 also supports mandril 26 for reciprocal movement therein. Mandril 26 is operable for actuating expanding member 22. A locator arm 28 extends from base 24 and comes in contact with side rails 16 when base member 24 is moved toward side rail 16 and expanding member 22 is inserted in an end 30 of a cross member 12. Mandrils 26 are supported within base member 24 in a cylindrical bore 3 and are actuated by conventional techniques for actuating expanding member 22.

Figure 1:
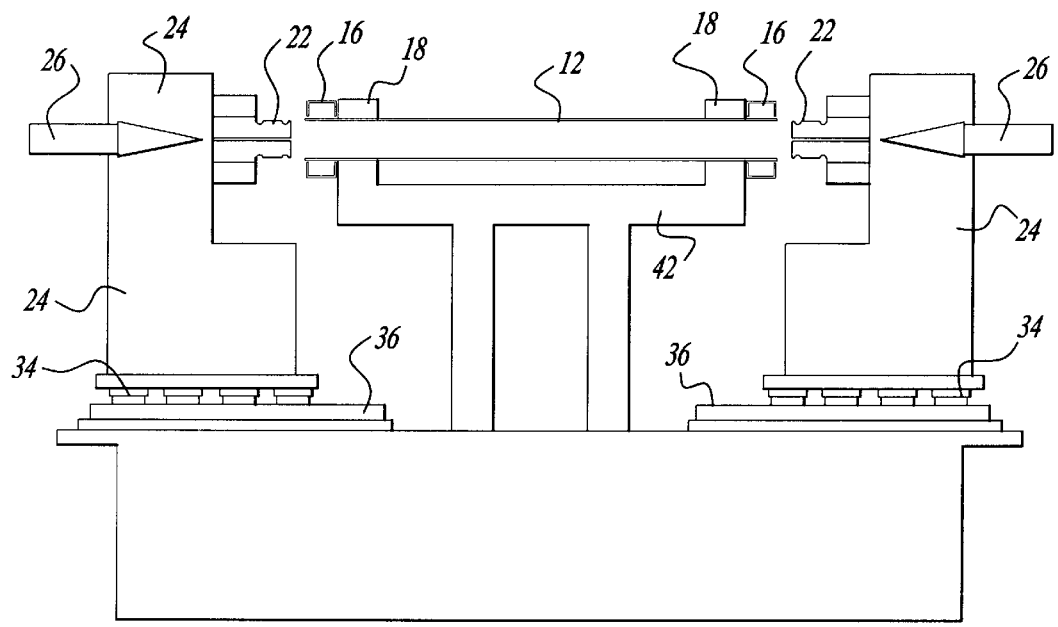
FIG. 1 is an end view of an apparatus for forming the side/cross member joint in a vehicle frame according to the principles of the present invention, with an expanding mechanism ready to be inserted in the end of the cross member.
Figure 2:
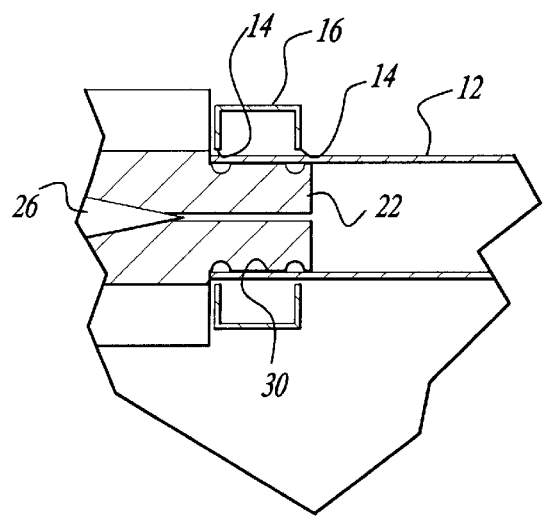
FIG. 2 is a detailed view of the expanding mechanism inserted in an end of a cross member prior to activation of the expanding mechanism.

With reference to FIGS. 1–6, the different stages for forming the side/cross member joint for vehicle frames will be described. In FIG. 1, cross members 12 are supported in the U-shaped slots 20 of spacer arm 18, and side rails 16 are supported on the ends 30 of cross members 12 which are inserted inside of openings 14 in side rail 16. Base members 24 are provided with slide members 34 which are disposed on tracks 36. Base 24 is movable from a disengaged position as shown in FIG. 1 to an engaged position wherein expanding mechanism 22 is inserted in the end 30 of cross member 12, as shown in FIG. 2.

Figure 3:
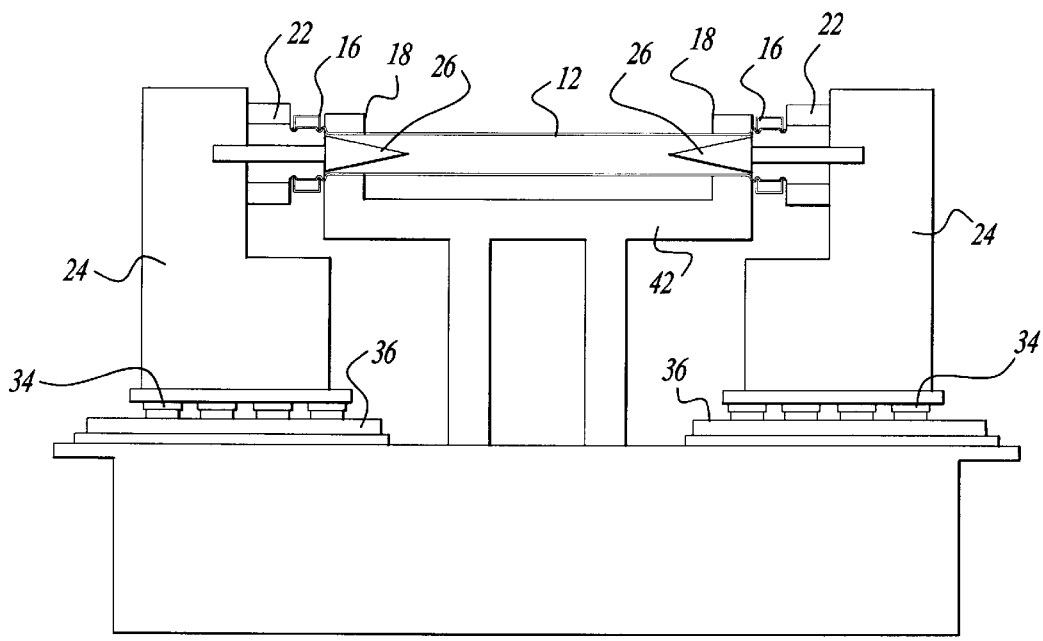
FIG. 3 is an end view of the apparatus shown in FIG. 1 with the expanding mechanism being activated in order to form the side/cross member joint according to the present invention.
Figure 4:
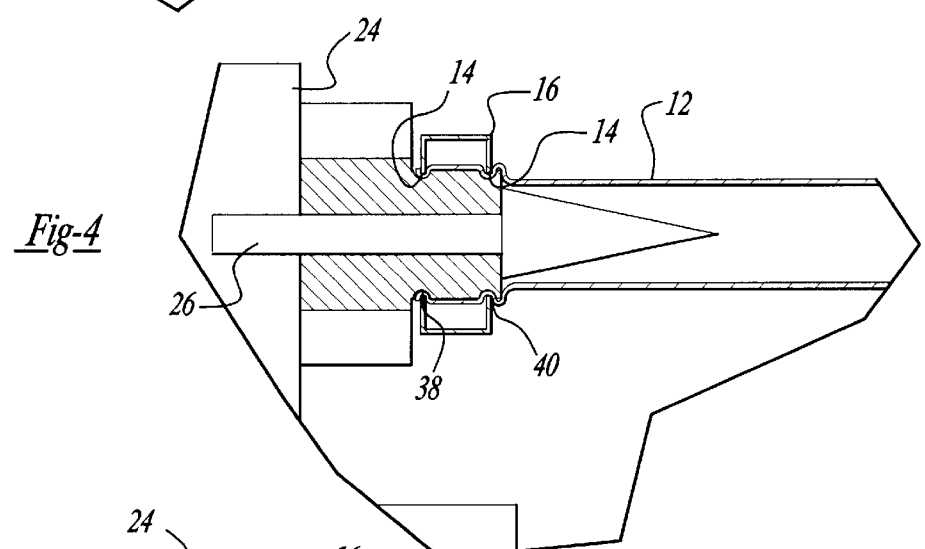
FIG. 4 is a detailed cross/sectional view of the expanding mechanism in the activated state wherein the side/cross member joint has been formed.

At this stage, the base members 24 on each side of cross member 12 are each moved toward one another and stopped at a position where cross member 12 is properly centered therebetween. The members 28 press against side rails 16 in order to secure the side rails 16 against spacer arms 18. With reference to FIGS. 3 and 4, the mandril 26 is driven through the expanding mechanism 22 to expand the end 30 of cross members 12 as shown in detail in FIG. 4. In FIG. 4, the actuation of the expanding member 22 forms a pair of grooves 38, 40 corresponding to the openings 14 in side rail 16. The details of the expanding mechanism and the grooves formed thereby will be later described herein.

Figure 6:
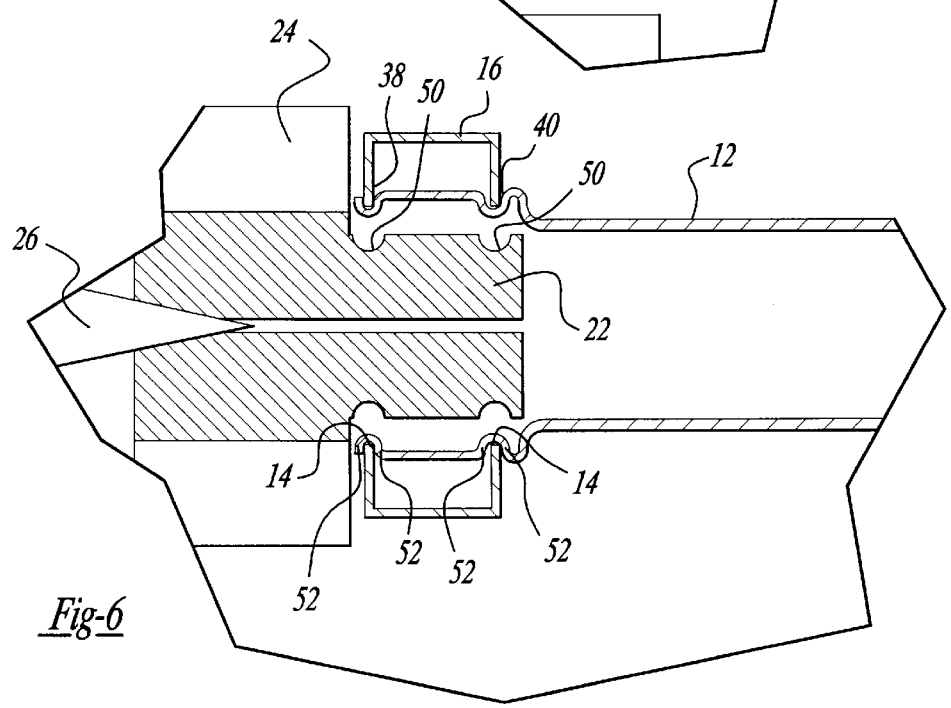
FIG. 6 is a detailed cross/sectional view of the side/cross member joint after the expanding mechanism has been deactivated.

With reference to FIG. 6, the mandril 26 is withdrawn from expanding mechanism 22 which allows expanding mechanism 22 to be released from cross member 12. As shown in FIG. 5, the base members 24 are then returned to their retracted position and the vehicle frame 10 can be removed from the frame support 42.

Figure 10:
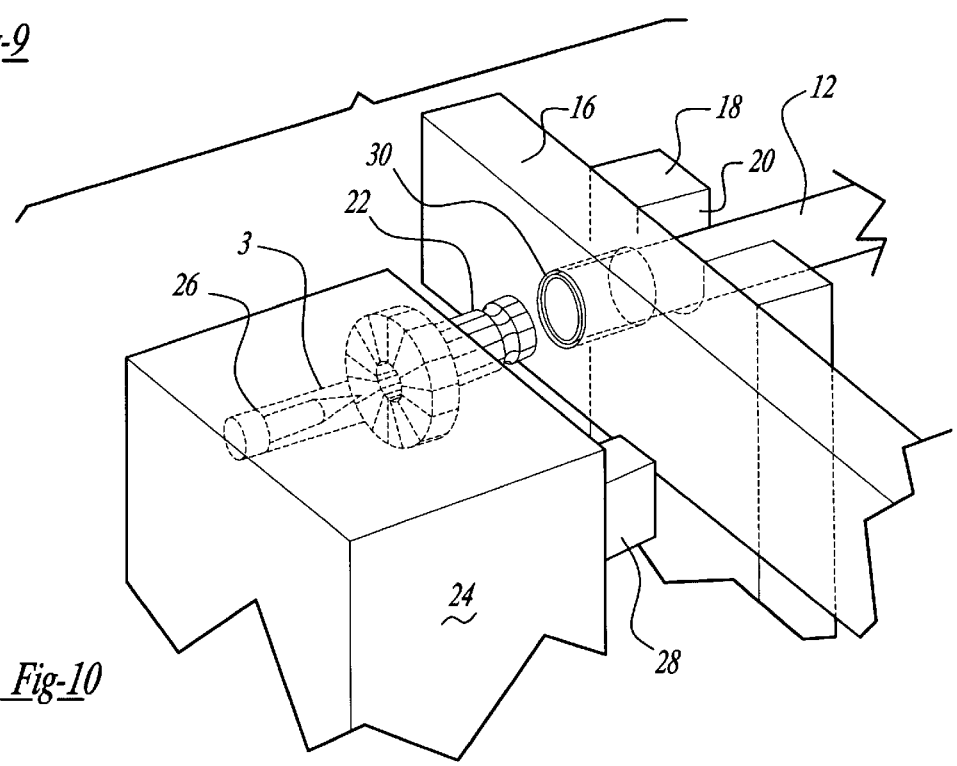
FIG. 10 is a perspective view of a side/cross member joint forming station according to the principles of the present invention.

With reference to FIG. 10, a perspective view of a work station for creating a side/cross member joint for a vehicle frame is shown. Cross member 12 is shown supported in U-shaped slot 20 of spacer arm 18 on frame support 42. The end 30 of cross member 12 is inserted through openings 14 in side rail 16. Expanding mechanism 22 is shown adjacent to end 30 of cross member 12. Mandril 26 is shown supported in cylinder 32 of base 24.

With reference to FIG. 7, the expanding mechanism 22 is shown inserted in the end 30 of cross member 12. The opening 14 in side rail 16 is provided with a plurality of flat edge portions 44 which are connected by a plurality of semi-circular edge portions 46. Expanding mechanism 22 is provided with a plurality of radially movable fingers 48. A plurality of the radially movable fingers 48 are provided with a flat radially outermost surface 48a, while the remaining fingers are provided with a semi-cylindrical radially outer surface 48b. The plurality of fingers 48 having a flat radially outermost surface 48a correspond with the flat edge portions 44 of opening 14. Each of the radially movable fingers 48 are provided with a pair of groove portions 50, as best shown in FIG. 8. The expanding mechanism 22 expands causing cross member 22 to deform to the configuration shown in FIG. 6. The plurality of flat edge portions 44 of opening 14 are engaged by a plurality of flat surfaces which are formed by the flat radially movable fingers 48 for providing a lock against rotation of the cross member 12 relative to the opening 14 of side rail 16. The groove portions 50 are provided for forming the grooves 38, 40 in the cross member 12. Grooves 38, 40 are defined by sidewalls 52 which are formed on each side of openings 14 of side rail 16, as best shown in FIG. 6. The sidewalls 52 prevent lateral slip of cross members 12 relative to side rails 16. Thus, grooves 38, 40 which are formed around openings 14 prevent lateral movement as well as rotational movement of cross member 12 relative to side rails 16.

With reference to FIG. 8, the mandril 26 is provided with a main shaft portion 60 having a tapered cam end 62 and a cylindrical base portion. Mandril 26 is driven through a central opening 66 of expanding mechanism 22 causing radial movement of radially movable fingers 48. Expanding mechanisms of this type are generally known with the exception of a portion of every other of the radially movable fingers 48 being provided with a flat radially outermost surface 48a. Expanding mechanisms of the general type are available from GWS Tool & Die Inc., Ontario, Canada.

The resulting side/cross member joint obtained by the method of the present invention has several advantages over the prior art techniques. In particular, a reduction in weight is achieved because the need for the conventional C-shaped collars is eliminated. Furthermore, the necessity for welding cross members 12 to side rails 16 is also reduced, and may possibly be eliminated. Furthermore, the technique of the present invention can be used for joining frame members of different materials such as joining aluminum members to steel members. A thin coat of resin or other material may be applied to the exterior surface of the cross member which can be made of, for example, aluminum in order to achieve a reduction in weight while the side rail can be used of a higher strength material such as steel, and the coating of the cross member 12 prevents electrolytic corrosion between the aluminum and steel members.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of making a side/cross member joint for a frame, comprising the steps of:

providing at least one hollow side member having two opposed side walls each having at least one opening therethrough;

inserting a generally cylindrical cross member in each opening in said opposed side walls of said at least one hollow side member;

inserting an expanding mechanism in an end of said cross member, said expanding mechanism including a plurality of radially movable fingers each having a pair of recessed groove portions corresponding with each said opening in said opposed side walls of said at least one hollow side member such that said pair of recessed groove portions are aligned with a respective opening in said opposed side walls of said at least one hollow side member; and activating said expanding mechanism by moving said radially movable fingers in a radially outward direction while said expanding mechanism is inserted in said end of said cross member, wherein said cross member is deformed radially outwardly such that an outer surface of said cross member is formed with a pair of grooves having radially extending walls on opposite sides of said openings in said side walls of said side member.

2. The method according to claim 1, further comprising the steps of holding said side member in a stationary position and aligning said cross member in said openings prior to said step of activating said expanding mechanism.

3. The method of claim 1 wherein the frame is a vehicle frame having a pair of side members.

4. The method of claim 3 which further comprises:

inserting the cross member into openings in a pair of side rails;

providing a pair of base members, each having an expanding mechanism mounted therein;

sliding each base member towards their respective side rails to insert their respective expanding mechanisms into the openings in each of said pair of side rails;

deactivating the expanding mechanisms after deformation of the cross members into the openings of the respective side rails; and retracting the base members to remove their respective expanding mechanisms from said pair of side rails.

5. The method of claim 4 wherein said openings in said pair of side rails have an irregular shape, and wherein the fingers of the expanding mechanisms correspond in shape to the irregular shaped openings in the side rails thereby preventing rotational movement of the cross member relative to said pair of side rails.

6. The method of claim 3 wherein there are two cross members and two side rails, with the method further comprising: providing four base members, each base member having an expanding mechanism;

inserting the two cross members into openings on opposing side rails thereby forming a frame subassembly;

placing the framed subassembly onto a support; and simultaneously moving the base members toward the frame rails to insert their respective expanding mechanisms into ends of the cross members whereby the expanding members cause deformation of their respective cross members; and retracting the base members to allow removal of the frame subassembly from the support.

7. A method of making a side/cross member joint for a vehicle frame, comprising the steps of:

providing at least one hollow side member having two opposed side walls each having at least one opening therethrough, a periphery of said openings including a plurality of semi-circular segments connected to a plurality of generally straight segments;

inserting a generally cylindrical cross member in each opening in said opposed side walls of said at least one hollow side member;

inserting an expanding mechanism in an end of said cross member, said expanding mechanism including a plurality of radially movable fingers each having a pair of recessed groove portions corresponding with each said opening in said opposed side walls of said at least one hollow side member such that said pair of recessed groove portions are aligned with a respective opening in said opposed side walls of said at least one hollow side member, wherein a plurality of said radially movable fingers have a generally flat radially outermost surface, corresponding with said generally straight segments of said openings, and a plurality of said radially movable fingers have a generally cylindrical radially outermost surface corresponding with said semi-circular segments of said openings; and activating said expanding mechanism by moving said radially movable fingers in a radially outward direction while said expanding mechanism is inserted in said end of said cross member, wherein said cross member is deformed radially outwardly such that an outer surface of said cross member is formed with a pair of grooves having radially extending walls on opposite sides of said openings in said side walls of said side member.

8. The method according to claim 7, further comprising the steps of holding said side member in a stationary position and aligning said cross member in said openings prior to said step of activating said expanding mechanism.

\* \* \* \* \*